2,836,595
Patented May 27, 1958

2,836,595
PIPERAZINE DERIVATIVES AND PROCESS FOR PRODUCING THE SAME

Robert F. Parcell, St. Clair Shores, Mich., assignor to Parke, Davis & Company, Detroit, Mich., a corporation of Michigan No Drawing. Application October 22, 1956
Serial No. 617,254

12 Claims. (Cl. 260—268)

This invention relates to certain organic compounds and to methods for obtaining the same. More particularly, the invention relates to 4-phenyl-1-piperazinealkyl carbamates and salts thereof which in free base form have the formula,

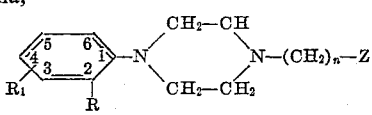

where R represents a chloro or bromo radical or an alkoxy, alkenyloxy, alkenylmercapto or alkylmercapto group containing from 1 to 5 carbon atoms, $R_1$ represents a hydrogen, chloro or bromo radical or an alkyl, alkoxy or alkylmercapto group containing from 1 to 5 carbon atoms, $R_1$ being substituted at either the 3- or 5-phenyl position, $n$ is an integer from 2 to 6 and Z represents a carbamyl residue having the formula,

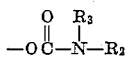

or

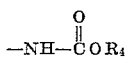

wherein $R_2$ and $R_3$ are the same or different and represent hydrogen or lower alkyl radicals containing from 1 to 4 carbon atoms and $R_4$ is a lower alkyl radical containing from 1 to 4 carbon atoms.

In accordance with the invention the products are produced by reacting a 4-phenyl-1-piperazinealkanol having the formula

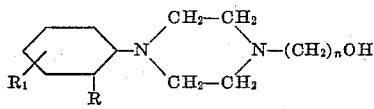

with a carbamyl ester or chloride having the formula

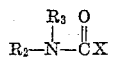

where X is an alkoxy or halide group and $n$, R, $R_1$, $R_2$ and $R_3$ have the foregoing significance. In carrying out the process the proportion of the reactants may be varied considerably but for best results the carbamyl ester or chloride is employed in excess of the amount theoretically required. The reaction is favored by the use of an inert organic solvent such as benzene, toluene, xylene, chlorobenzene and the like. The preferred solvent is toluene since it forms azeotropic mixtures with low boiling alcohols. The temperature of the reaction is not critical; however, at temperatures lower than 50° C. the course of the reaction is unduly extended whereas at temperatures in excess of 150° C. there is a tendency toward undesirable decomposition thereby lowering the yield of the intended product. Where the reaction is carried out employing a carbamly ester as a starting material, a catalytic amount of a metal alkoxide, preferably aluminum alkoxide such as aluminum isopropoxide, is ordinarily required.

According to another embodiment of the invention the products are prepared by reacting a 4-phenyl-1-piperazinealkanol having the formula

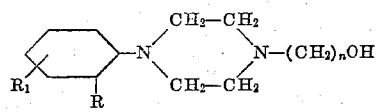

with an isocyanate of the formula $R_5$—N=CO, where $n$, R and $R_1$ have the foregoing significance and $R_5$ represents a lower alkyl radical containing 1 to 4 carbon atoms. In carrying out the reaction the proportion of the reactants is not critical. An excess of the isocyanate is preferred, however, for maximum yields. The reaction is favored by the use of an inert organic solvent such as benzene, toluene, xylene, chlorobenzene and the like. The reaction takes place at room temperature within short periods of time so that it is unnecessary to apply external heat.

According to a further embodiment of the invention the products are obtained by reacting a 4-phenyl-1-piperazinealkylamine having the formula

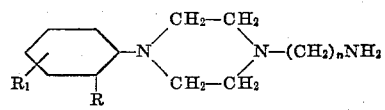

with a carbalkoxy chloride having the formula

wherein $n$, R, $R_1$ and $R_4$ have the foregoing significance. The reaction is favored by the use of an inert organic solvent such as benzene, toluene, xylene, chlorobenzene and the like. The preferred range of temperature is 20 to 100° C. The proportion of the reactants can be varied considerably but for best results, the carbalkoxy chloride is employed in excess.

As indicated, the products of the invention occur in the free base, as well as acid salt form. The acid salts are particularly useful in that they may be readily recrystallized and purified. The salts can be prepared by reacting the product in free base form with the desired acid in the presence of a suitable organic solvent in which the intended salt is insoluble thereby permitting isolation of the salt by suitable methods such as filtration, decantation, etc. Among the many acid salts which can be produced in accordance with the invention may be mentioned hydrochloric, hydrobromic, sulfuric, phosphoric, acetic and citric acid salts.

The products of the invention have been found to possess outstanding activity in depressing the central nervous system and are useful when administered orally in suitable dosage form in the treatment of hypertension and in the prevention of nausea and vomiting.

The 4-phenyl-1-piperazinealkanols, employed as starting materials for the present invention, can be prepared by condensing the appropriate substituted-phenylpiperazine with a reactive derivative of an omega-hydroxy alkanol and where required, reducing or hydrolyzing the condensation product. As reactive dirivatives, ethylene oxide, methyl acrylate, ethyl gamma-bromobutyrate, 5-bromopentanol - 1 - acetate and 5 - carbomethoxyvaleryl chloride can be employed. The substituted-phenyl-piperazines can be prepared by condensing the appropriate nuclearly-substituted aniline in hydrohalide salt form with bis-($\beta$-haloethyl)amine hydrohalide, at elevated temperature.

The 4-phenyl-1-(omega-aminopropyl)piperazines, also employed as starting materials, can be prepared by condensing the phenylpiperazine with the appropriate omega-haloalkylnitrile or omega-haloalkanoylamide and reducing the condensation product.

The invention is illustrated by the following examples.

Example 1

(a) A solution of 25 g. of 4-o-n-propylmercaptophenyl-1-piperazinepentanol, 75 ml. of benzene and 7 g. of ethyl isocyanate is allowed to stand at room temperature (20–23° C.) for four days. The reaction mixture is evaporated on a steam bath and the residual product, 4-o-n-propylmercaptophenyl - 1 - piperazinepentanol, N-ethyl carbamate ester, is converted to the monohydrochloride with an equivalent of iso-propanolic hydrogen chloride. This mixture is recrystallized from a mixture of isopropanol and ether to yield 4-o-n-propylmercaptophenyl-1-piperazinepentanol, N-ethyl carbamate ester monohydrochloride, M. P. 160–161.5° C.

The piperazinepentanol starting material can be prepared as follows: A solution of 500 g. of o-aminobenzenethiol in 600 ml. of methanol is treated with a solution of 168 g. of sodium hydroxide in 200 ml. of water. The resulting solution is cooled to 35–40° C. Over a period of thirty minutes, 492 g. of n-propyl bromide is added, cooling whenever necessary to keep the temperature at or slightly below 75° C. As soon as the addition is complete, cooling is discontinued and the resulting mixture is stirred for one hour. The mixture is mixed with 2 liters of water and 1 liter of benzene, stirred well and separated. The benzene layer is washed with dilute sodium hydroxide and evaporated. The residue is distilled under reduced pressure. A mixture of 380 g. of the distilled product (o-propylmercaptoaniline, B. P. 97–99° C. at 1 mm. of mercury), 203 g. of bis($\beta$-bromoethyl)-amine hydrobromide and 300 ml. of chlorobenzene is stirred and refluxed for four hours. The chlorobenzene is removed by steam distillation and the residue made strongly basic with aqueous sodium hydroxide and extracted with benzene. The benzene is removed by evaporation and the residue distilled in vacuo. A mixture of 95 g. of the distilled product (1-o-propylmercaptophenylpiperazine, B. P. 124–127° C. at 0.2 mm. of mercury), 84 g. of 5-bromopentanol-1, acetate ester, 70 g. of anhydrous potassium carbonate and 400 ml. of reagent acetone is stirred and refluxed for eighteen hours. The reaction mixture is filtered and the filtrate evaporated on the steam bath. The residue is dissolved in 700 ml. of methanol and 10 g. of sodium methoxide is added and the solution again evaporated. The residue is diluted in 500 ml. of benzene and washed twice with 200 ml. portions of water. The benzene solution is evaporated and the residue is distilled under reduced pressure. The product is the desired starting material, 4-o-propylmercaptophenyl-1-piperazinepentanol, B. P. 175–200° at 0.1 mm. of mercury.

(b) The corresponding 4-o-n-proylmercaptophenyl-1-piperazinepropanol, N-ethyl carbamate ester and hydrochloride salt thereof (M. P. 158–160° C.) are prepared by the method set forth in (a) above starting with a solution of 7 g. of ethyl isocyanate and 25 ml. of benzene and of 25 g. of 4-o-n-propylmercaptophenyl-1-piperazinepropanol obtained as described hereinafter under Example 3.

(c) By the method set forth in (a) above 4-o-ethoxyphenyl-1-piperazinehexanol, N-ethyl carbamate ester and the hydrochloride salt thereof (M. P. 97–99° C.) are prepared starting with a solution of 30.6 g. of 4-o-ethoxyphenyl-1-piperazinehexanol, 10 g. of ethyl isocyanate and 50 ml. of benzene.

Example 2

A mixture of 34 g. of 4-o-n-propylmercaptophenyl-1-piperazinepentanol, 11 g. of ethyl carbamate and 85 ml. of toluene is heated to reflux temperature and 20 ml. of distillate is removed. Two grams of aluminum isopropoxide is added to the reaction mixture and the alcohol is removed by azeotropic distillation through a 14 inch distillation column over a period of about one hour. The residue is diluted with 500 ml. of benzene and shaken twice with hot water and filtered through diatomaceous earth. The benzene layer is decanted and concentrated to about 150 ml. by distillation, diluted with petroleum ether, chilled and filtered. The product is 4-o-propylmercaptophenyl-1-piperazinepentanol carbamate ester, M. P. 92–93° C. This product may be converted to the monohydrochloride by treating with one equivalent of hydrogen chloride in isopropanol and recrystallizing from isopropanol-ether mixture.

In like manner the following phenylpiperazine carbamate compounds can be prepared:

| | Melting point, ° C. |
|---|---|
| 4-o-ethoxyphenyl-1-piperazinehexanol carbamate ester | 111–113 |
| 4-o-methoxyphenyl - 1 - piperazinepropanol carbamate ester, hydrochloride | 140–141 |
| 4-o-methoxyphenyl - 1 - piperazinepropanol N-methyl carbamate ester, hydrochloride | 181–184 |
| 4-o-methoxyphenyl - 1 - piperazinepropanol N-ethyl carbamate ester, dihydrochloride | 201–203 |
| 4-o-methoxyphenyl - 1 - piperazinepentanol carbamate ester, hydrochloride | 175–178 |
| 4-o-chlorophenyl-1-piperazinehexanol carbamate ester | 93–94 |
| 4-(2,3-dichlorophenyl) - 1 - piperazinepropanol carbamate ester | 170–171 |
| 4-(2,3-dichlorophenyl) - 1 - piperazinepentanol carbamate ester | 132–134 |

Example 3

A mixture of 37 g. of 4-o-n-propylmercaptophenyl-1-piperazinepropanol, 12 g. of ethylcarbamate and 80 ml. of toluene is heated at reflux temperature and treated with aluminum isopropoxide, etc., in accordance with the method of Example 2. The resulting product is 4-o-propylmercaptophenyl-1 - piperazinepropanol carbamate ester, M. P. 107–108° C.

The piperazine propanol starting material can be prepared as follows: A mixture of 95 g. of 1-o-propylmercaptophenylpiperazine and 37 g. of methyl acrylate is allowed to stand sixteen hours in an ice bath with the temperature rising to 20° as the ice melts. The reaction mixture is diluted with an equal volume of ether and added slowly to a stirred slurry of 16 g. of lithium aluminum hydride in one liter of ether. The reaction mixture is stirred for thirty minutes after the addition and then decomposed with 17 ml. of water, 11 ml. of 20% sodium hydroxide and 59 ml. of water. The reaction mixture is filtered and the filtrate evaporated. The residue is distilled under reduced pressure and the fraction boiling at 175–190° C., at 0.25 mm. of mercury is retained. This product, 4-o-n-propylmercaptophenyl-1-piperazinepropanol (M. P. 59–62° C.), is the desired starting material for the above procedure.

Example 4

A mixture of 47.2 g. of 4-o-methoxyphenyl-1-piperazineethanol and 19 g. of ethyl carbamate in 100 ml. of toluene is treated with 2 g. of aluminum isoproxide in accordance with the method of Example 2 and the product treated with hydrogen chloride in isopropanol to obtain 4-o-methoxyphenyl-1-piperazineethanol carbamate ester monohydrochloride which is isolated and recrystallized from isopropanol-ether mixture.

The starting material, 4-o-methoxyphenylpiperazineethanol, can be prepared by allowing a mixture of 25 g. of o-methoxypiperazine and 5 g. of ethylene oxide in 50 ml. of 95% ethanol to stand four days at room temperature and subsequently removing the solvents by distillation under reduced pressure.

Example 5

A mixture of 23.6 g. of 4-o-methoxyphenyl-1-piperazineethanol, 12.5 g. of ethyl N-ethyl carbamate, 2 g. of aluminum isopropoxide and 100 ml. of toluene is placed in a 500 ml. flask and heated at reflux temperature. The toluene-ethanol azeotrope is removed by distillation and the residue is diluted with 350 ml. of benzene and washed three times with dilute sodium hydroxide solution. The solution is charcoaled and filtered and the filtrate placed on a steam bath and the solvents removed. The residual product, 4-o-methoxyphenyl-1-piperazineethanol N-ethyl carbamate ester, is converted to the dihydrochloride (M. P. 194–195° C.) with isopropanolic hydrogen chloride.

Example 6

A solution of 15 g. of 4-o-methoxyphenyl-1-piperazinepentanol and 4 g. of ethyl isocyanate in 50 ml. of benzene is allowed to stand for three days at 20–23° C. The reaction mixture is evaporated on the steam bath and the residue is diluted with petroleum ether and triturated repeatedly with fresh petroleum ether. The residual oil is converted to the monohydrochloride with an equivalent amount of isopropanolic hydrogen chloride and recrystallized from a mixture of isopropanol and ether. The product is 4-o-methoxyphenyl-1-piperazinepentanol N - ethylcarbamate ester, monohydrochloride, M. P. 153–154° C.

Example 7

A solution of 28 g. of 4-o-methoxyphenyl-1-piperazinepentanol, 10 g. of butyl isocyanate and 75 ml. of benzene is allowed to stand at room temperature (20–22° C.) for twenty-four hours. The product is converted to the monohydrochloride with one equivalent of isopropanolic hydrogen chloride. Ether is added to induce precipitation and the product, 4-o-methoxyphenyl-1-piperazinepentanol N-butylcarbamate ester monohydrochloride, is recrystallized from a mixture of isopropanol and ether; M. P. 137–138° C.

Example 8

A solution of 28 g. of 4-o-methoxyphenyl-1-piperazinepentanol and 18 g. of dimethylcarbamyl chloride in 75 ml. of chlorobenzene is heated at reflux temperature for forty-eight hours. The reaction mixture is cooled and then diluted with ether until crystallization occurs. The precipitate is removed by filtration, dissolved in isopropanol and concentrated to about 100 ml. The concentrate is diluted with 600 ml. of ether, chilled and filtered. The product is 4-o-phenyl-1-piperazinepentanol dimethylcarbamate ester monohydrochloride, M. P. 153.5–155° C.

Example 9

Starting with a mixture of 45 g. of 4-o-chlorophenyl-1-piperazinehexanol and 14 g. of ethyl carbamate in 100 ml. of toluene, the procedure of Example 2 is carried out employing 2 g. of aluminum isopropoxide. The resulting product is 4-o-chlorophenyl-1-piperazinehexanol carbamate ester, M. P. 93–94° C. The piperazinehexanol starting material can be prepared as follows: 357.2 g. of 5-carbomethoxyvaleryl chloride is added dropwise to a stirred solution of 786.7 g. of 1-o-chlorophenylpiperazine in 3.5 liters of benzene with cooling in an ice bath. The addition is carried out at such a rate that the temperature of 15±2° is maintained. When the addition is complete the reaction is warmed to 350° C. and stirred for one hour. The solution is filtered and the precipitate is washed well with benzene and ether. The filtrate is washed and combined, concentrated to approximately 1.5 liters, and added over a period of three hours to a stirred slurry of 170 g. of lithium aluminum hydride in six liters of dry ether. The reaction mixture is stirred for five hours and then decomposed with 175 ml. of water, 134 ml. of 20% sodium hydroxide and 626 ml. of water. The mixture is filtered, concentrated to approximately 800 ml. on a steam bath, and diluted with petroleum ether to 1300 ml. with chilling and vigorous stirring. The mixture is filtered and the precipitate, comprising the desired 4-o-chlorophenyl-1-piperazinehexanol, M. P. 60–63° C., is washed with petroleum ether.

Example 10

Starting with a mixture of 35 g. of 4-(5-chloro-2-ethylmercaptophenyl)-1-piperazinepentanol, 10 g. of ethyl carbamate and 125 ml. of toluene, the procedure of Example 2 is carried out employing 2 g. of aluminum isopropoxide. The resulting product is 4-(5-chloro-2-ethylmercaptophenyl)-1-piperazinepentanol carbamate ester.

The piperazinepentanol starting material can be prepared as follows: A mixture of 209 g. of 5-chloro-2-ethylmercaptoaniline, 174 g. of bis(2-bromoethyl)amine hydrobromide and one liter of the butanol is stirred and refluxed for sixteen hours. An excess of aqueous sodium hydroxide is added and butanol is removed by steam distillation. The residue is cooled and extracted with ether. The ether layer is washed with two portions of 300 ml. of water and then extracted with 800 ml. of water containing 52 ml. of concentrated hydrochloric acid. The ethereal and aqueous layers are separated. The aqueous layer is made basic and extracted with ether. The ethereal layer is dried and the ether removed by distillation. The residue is distilled under reduced pressure. The fraction boiling at 140–180° C. at 0.5 mm. is collected and redistilled under vacuum. The fraction boiling at 145–149° C. at 0.25 mm. is 1-(5-chloro-2-ethylmercaptophenyl)piperazine. A mixture of 54 g. of 1-(5-chloro-2-ethylmercaptophenyl)piperazine, 22 g. of 5-bromopentanol-1-acetate ester and 250 ml. of benzene is stirred under reflux for sixteen hours. The reaction mixture is diluted to one liter with ether, stirred and filtered. The solvent is taken off by evaporation and the residue is taken up in 500 ml. of methanol. Two grams of sodium methoxide is added and the solvent again is taken off. The residue is diluted to 500 ml. with ether, washed three times with 200 ml. of water and the ethereal solution dried over magnesium sulfate. The solvent is taken off leaving the desired 4-(5-chloro-2-ethylmercaptophenyl)-1-piperazinepentanol which melts at 164–165° C. as the monohydrochloride.

Example 11

A solution of 59 g. of 1-(3-aminopropyl)-4-o-propylmercaptophenylpiperazine and 300 of benzene is treated with 11 g. of ethyl chloroformate in 40 ml. of benzene. After thirty minutes the reaction mixture is concentrated to 150 ml. and chilled thoroughly. The mixture is diluted with 4 volumes of ether, the residual oil is isolated by decantation and triturated with ether until crystallized. The product, N-[3-(4-o-propylmercaptophenyl-1-piperazinyl)-propyl]carbamic acid, ethyl ester, monohydrochloride, is purified by recrystallizing from isopropanol-ether mixture; M. P. 145–147° C.

The aminopropylpiperazine starting material can be prepared as follows: A mixture of 118 g. of 1-o-n-propylmercaptophenylpiperazine and 29 g. of acrylonitrile is allowed to stand for three days at room temperature. The resultant product, 4-o-n-propylmercaptophenyl-1-piperazinepropionitrile, is diluted with an equal volume of benzene and slowly added to a stirred slurry of 22 g. of lithium aluminum hydride in 1.5 liters of ether. The reaction mixture is then stirred for three hours and finally decomposed with 23 ml. of water, 17.5 ml. of 20% sodium hydroxide and 81 ml. of water in that order. The mixture is stirred and filtered, and the filtrate is concentrated to a low volume on a steam bath. The residue is distilled under vacuum and the desired 1-(3-aminopropyl)-4-(o-n-propylmercaptophenyl)piperazine is obtained as the fraction boiling at 163–166° C. at 0.25 mm.

In like manner, the following phenylpiperazinylcarbamic acid esters can be obtained:

| | Melting point, °C. |
|---|---|
| N - [3 - (4 - o - propylmercaptophenyl - 1 - piperazinyl) - propyl] - carbamic acid, methyl ester, hydrochloride | 132.5–134 |
| N - [3 - (4 - o - propylmercaptophenyl - 1 - piperazinyl) - propyl] - carbamic acid, propyl ester, hydrochloride | 140–142 |
| N - [4 - (4 - o - propylmercaptophenyl - 1 - piperazinyl) - butyl] - carbamic acid, ethyl ester, hydrochloride | 153.5–155 |
| N - [4 - (4 - o - propylmercaptophenyl - 1 - piperazinyl) - butyl] - carbamic acid, propyl ester, hydrochloride | 146–148 |
| N - [5 - (4 - o - propylmercaptophenyl - 1 - piperazinyl) - pentyl] - carbamic acid, ethyl ester, hydrochloride | 108–110 |
| N - [5 - (4 - o - propylmercaptophenyl - 1 - piperazinyl) - pentyl] - carbamic acid, propyl ester, hydrochloride | 107.5–108.5 |
| N - [5 - (4 - o - propoxyphenyl - 1 - piperazinyl) - pentyl] - carbamic acid, methyl ester, hydrochloride, hemihydrate | 106–107 |
| N - [5 - (4 - o - propoxyphenyl - 1 - piperazinyl) - pentyl] - carbamic acid, ethyl ester, hydrochloride, hemihydrate | 102–104 |

*Example 12*

A solution of 32 g. of 1-(5-aminopentyl)-4-o-propylmercaptophenylpiperazine in 100 ml. of benzene is treated with 12 g. of methyl chloroformate with cooling. The reaction mixture is allowed to stand for one hour at room temperature and the solvent is removed by evaporation at steam bath temperature. The residue is cooled and diluted with ether and the oil which is present is triturated until crystallized. The product, N-[5-(4-o-propylmercaptophenyl-1-piperazinyl) - pentyl]-carbamic acid, methyl ester, monohydrochloride, is purified by recrystallizing from isopropanol-ether mixture; M. P. 123–125° C.

The aminopentylpiperazine starting material can be prepared as follows: 118 g. of 1 - o - propylmercaptopiperazine is dissolved in 800 ml. of acetone containing 150 g. of anhydrous potassium carbonate. To this mixture is added 81 g. of 5-bromovaleronitrile. The mixture is stirred vigorously and heated at reflux temperature for sixteen hours. The reaction mixture is filtered to remove solids and the acetone is removed by evaporation at steam bath temperature. 400–500 ml. of benzene is added to the residue and the solution is charcoaled and filtered. The solution is concentrated to approximately 250 ml. by evaporation and the concentrate is gradually added to a slurry of 23 g. of lithium aluminum hydride in one liter of anhydrous ether. The resultant mixture is stirred for thirty minutes and the excess lithium aluminum hydride is decomposed by the addition, in order, of 24 ml. of water, 18 ml. of 20% sodium hydroxide and 86 ml. of water. The solution is filtered, the solvent removed by evaporation and the residual mixture is distilled under vacuum. The desired 1 - (5 - aminopentyl) - 4 - o - propylmercaptophenylpiperazine is obtained as the fraction boiling at 165° C. (0.1 mm.).

*Example 13*

A solution of 28 g. of 4 - o - propylmercaptophenyl-1-piperazinebutanol, 10 g. of ethyl isocyanate and 50 ml. of benzene is allowed to stand for eighteen hours at room temperature. The solvent is removed from the reaction mixture by evaporation over a steam bath. The residual product, 4 - o - propylmercaptophenyl - 1 - piperazinebutanol, N-ethyl carbamate ester, is converted to the monohydrochloride with an equivalent amount of isopropanolic hydrogen chloride. The monohydrochloride which forms as a crystalline precipitate is collected and recrystallized from a mixture of isopropanol and ether; M. P. 129–130° C.

The piperazinebutanol starting material can be prepared as follows: 97 g. of 1-o-propylmercaptophenylpiperazine and 81 g. of ethyl γ-bromobutyrate are dissolved in 700 ml. of acetone containing 138 g. of anhydrous potassium carbonate. The mixture is refluxed for sixteen hours with vigorous stirring. After cooling, the mixture is filtered and the filtrate is concentrated on a steam bath. The concentrate is dissolved in 300–400 ml. of benzene, the solution is charcoaled and filtered and the filtrate concentrated to a volume of 100–150 ml. The solution is added to a slurry of 15 g. of lithium aluminum hydride in one liter of ether. After the addition of the benzene solution, the reaction mixture is stirred for an additional thirty minutes and the mixture is decomposed by adding, in order, 16 ml. of water, 12 ml. of 20% sodium hydroxide solution and 54 ml. of water. The solution is stirred, filtered, and the solvents are removed from the filtrate by evaporation. The residue is subjected to vacuum distillation; the fraction boiling at 170° C. (0.25 mm.) is 4 - o - propylmercaptophenyl-1-piperazinebutanol.

*Example 14*

Aluminum isopropoxide (2 g.) is added to a mixture of 31.5 g. of 4-o-allylmercaptophenyl-1-piperazinepentanol and 11 g. of ethyl carbamate in 150 ml. of toluene. The ethanol which is produced is removed as an azeotrope through a distillation column. When the temperature of the distillate exceeds 100° C., the residue is diluted with 250 ml. of benzene and washed with hot water, filtered and the solvent removed by evaporation on a steam bath. The residue is diluted with petroleum ether and the crystalline precipitate which forms, 4-o-allylmercaptophenyl-1-piperazinepentanol, is recrystallized from a mixture of benzene and petroleum ether. The monohydrochloride salt is produced by treating the free base with one equivalent of hydrogen chloride in isopropanol. The salt which forms is collected and recrystallized from a mixture of isopropanol and ether; M. P. 155–156° C.

The piperazinepentanol starting material can be prepared as follows: A solution of 248 g. of sodium hydroxide in 500 ml. of water is added to a solution of 751.2 g. of 2-aminobenzenethiol in one liter of methanol. Allyl bromide (726 g.) is added dropwise while maintaining the temperature at reflux. The reaction mixture is stirred for one hour and then diluted with two liters of water and extracted with 1.5 liters of ether. The extract is washed with water and sodium hydroxide and the ether is removed by evaporation. The residue is distilled and o-allylmercaptoaniline is collected as the fraction boiling at 99–100° C. (1.4 mm.). o-Allylmercaptoaniline (714 g.) and 692 g. of bis-(β-bromoethylamine)-hydrobromide in 1200 ml. of chlorobenzene is heated to 100° C.; heating is discontinued and when the reaction subsides, as indicated by falling temperature, 217 g. of triethylamine is added rapidly. Another 217-g. quantity of triethylamine is added over a period of about one-half hour, following which the mixture is refluxed for two hours and the solvent then removed by steam distillation. The residue is diluted with 30% sodium hydroxide solution and extracted with ether. The ether layer is washed several times with dilute sodium hydroxide and water, dried and the ether is removed by evaporation. The residue is distilled under vacuum and 1-o-allylmercaptophenylpiperazine is collected as the fraction boiling at 80° C. (0.25 mm.). A mixture of 94 g. of 1-o-allylmercaptophenylpiperazine, 42 g. 5-bromopentanol-1 acetate ester and 350 ml. of benzene is stirred and refluxed for sixteen hours. Benzene (270 ml.) is removed by distillation and the residue is diluted with 700 ml. of ether and filtered. The filtrate is evaporated on a steam bath and 400 ml. of methanol containing 2 g. of sodium ethoxide is added. The reaction mixture is again evaporated and the residue diluted with 600 ml. of ether. The ethereal solution is washed three times with 100 ml. of water and then dried over anhydrous magnesium sulfate. The drying agent is removed and the solution again evaporated. The residual product, 4-o-allylmercaptophenyl-1-piperazinepentanol, is the desired starting material for the above example.

*Example 15*

31.5 g. of 4-o-allymercaptophenyl-1-piperazinepentanol is dissolved in 150 ml. of benzene; 10 g. of ethyl isocyanate is added and the reaction mixture is allowed to stand at room temperature for twenty-four hours. The product, 4-o-allymercaptophenyl-1-piperazinepentanol N-ethyl carbamate ester, is obtained as the residue remaining after removal of the solvent by evaporation from the reaction mixture. The corresponding monohydrochloride salt is obtained by treating the product with excess hydrogen chloride in isopropanol; after recrystallization from isopropanol-ether the monohydrochloride salt has a melting point of 150–151° C.

*Example 16*

A solution of 58.5 g. of 1-o-allylmercaptophenylpiperazine, 21 g. of bromovaleronitrile and 200 ml. of benzene is stirred at reflux temperature for eighteen hours. About 200 ml. of benzene is removed by distillation and the residue is diluted with 500 ml. of dry ether. The precipitate is removed by filtration and the filtrate is evaporated on the steam bath to approximately 100 ml. This solution is rapidly added drop-wise to a stirred slurry of 6 g. of lithium aluminum hydride in one-half liter of ether and there are added succesively 6 ml. of water, 5 ml. of 20% sodium hydroxide and 22 ml. of water. The precipitate is removed by filtration and the filtrate evaporated on the steam bath to give 1-(5-aminopentyl)-4-o-allylmercaptophenylpiperazine.

The crude 1-(5-aminopentyl)-4-o-allylmercaptophenylpiperazine is dissolved in 150 ml. of benzene and treated with 13 g. of methyl chloroformate and allowed to stand for one hour. The reaction mixture is diluted with 400 ml. of ether and then washed with an excess of sodium bicarbonate. The ethereal solution is dried with magnesium sulfate, filtered, and the filtrate evaporated. The residual product, N-[5-(4-o-allylmercaptophenyl-1-piperazinyl)-pentyl]carbamic acid, methyl ester, may be converted to the monohydrochloride with an equivalent amount of isopropanolic hydrogen chloride; M. P. 135–137° C. (monohydrochloride).

I claim:

1. A member of the class consisting of 4-phenyl-1-piperazinealkyl carbamates and acid salts thereof having in free base form the formula

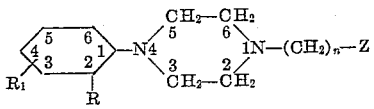

in which Z is a member of the class consisting of

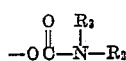

and

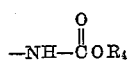

where R is a member of the class consisting of chlorine and bromine radicals and alkoxy, alkenyloxy, alkenylmercapto and alkylmercapto groups having from 1 to 5 carbon atoms, $R_1$ is a member of the class consisting of hydrogen, 3-substituted and 5-substituted chlorine and bromine radicals and 3-substituted and 5-substituted alkyl, alkoxy and alkylmercapto groups having from 1 to 5 carbon atoms, each of $R_2$ and $R_3$ is a member of the class consisting of hydrogen and alkyl radicals having from 1 to 4 carbon atoms, $R_4$ is an alkyl radical having from 1 to 4 carbon atoms, and $n$ is an integer from 2 to 6.

2. 4-o-n-propylmercaptophenyl - 1 - piperazinepentanol, N-ethyl carbamate ester.

3. 4-o-allylmercaptophenyl-1-piperazinepentanol, carbamate ester.

4. N-[5 - (4-o-propylmercaptophenyl - 1 - piperazinyl)-pentyl]-carbamic acid, methyl ester.

5. 4-o-n-propylmercaptophenyl - 1 - piperazinepropanol, carbamate ester.

6. 4-o-n-propylmercaptophenyl - 1 - piperazinepentanol, carbamate ester.

7. 4-o-n - propylmercaptophenyl - 1 - piperazinebutanol, ethyl carbamate ester.

8. N-[5-(4-allylmercaptophenyl-1-piperazinyl)-pentyl] carbamic acid, methyl ester.

9. 4-o-allylmercaptophenyl-1-piperazinepentanol, ethyl carbamate ester.

10. Process which comprises reacting a 4-phenyl-1-piperazinealkanol having the formula

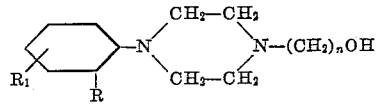

and a carbamic acid derivative having the formula, $R_2$—$N(R_3)$—CO—X, where R is a member of the class consisting of chlorine and bromine radicals and alkoxy, alkenyloxy, alkenylmercapto and alkylmercapto groups having from 1 to 5 carbon atoms, $R_1$ is a member of the class consisting of hydrogen, chlorine and bromine radicals and 3-substituted and 5-substituted alkyl, alkoxy and alkylmercapto groups having from 1 to 5 carbon atoms, each of $R_2$ and $R_3$ is a member of the class consisting of hydrogen and alkyl radicals having from 1 to 4 carbon atoms, $n$ is an integer from 2 to 6 and X is a member of the group consisting of alkoxy and halide groups.

11. Process which comprises reacting a 4-phenyl-1-piperazinealkanol having the formula

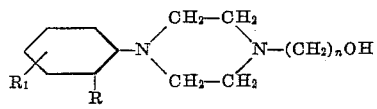

and an isocyanate having the formula, $R_5$—N=CO, where R is a member of the class consisting of chlorine and bromine radicals and alkoxy, alkenyloxy, alkenylmercapto and alkylmercapto groups having from 1 to 5 carbon atoms, $R_1$ is a member of the class consisting of hydrogen, chlorine and bromine radicals and 3-substituted and 5-substituted alkyl, alkoxy and alkyl-mercapto groups having from 1 to 5 carbon atoms, $R_5$ is an alkyl radical having from 1 to 4 carbon atoms, and $n$ is an integer from 2 to 6.

12. Process which comprises reacting a 4-phenyl-1-piperazinealkylamine having the formula

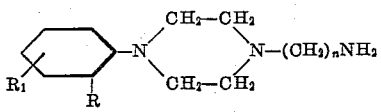

and a carbalkoxy chloride having the formula $R_4$OCO—Cl, where R is a member of the class consisting of chlorine and bromine radicals and alkoxy, alkenyloxy, alkenylmercapto and alkylmercapto groups having from 1 to 5 carbon atoms, $R_1$ is a member of the class consisting of hydrogen, chloride and bromine radicals and 3-substituted and 5-substituted alkyl, alkoxy, and alkylmercapto groups having from 1 to 5 carbon atoms, $R_4$ is a lower alkyl radical containing from 1 to 4 carbon atoms and $n$ is an integer from 2 to 6.

No references cited.